United States Patent [19]
Heath et al.

[11] Patent Number: 5,137,543
[45] Date of Patent: Aug. 11, 1992

[54] ABRASIVE PRODUCT

[76] Inventors: Peter J. Heath, 13 Heatherdale Road, Camberley, Surrey; Christopher E. Denham, 42 Hythe Close, Forest Park, Bracknell, Berkshire, both of England

[21] Appl. No.: 675,144

[22] Filed: Mar. 26, 1991

[30] Foreign Application Priority Data

Mar. 26, 1990 [GB] United Kingdom ............... 9006703

[51] Int. Cl.$^5$ ............................................. C09K 3/14
[52] U.S. Cl. .................................. 51/298; 51/293; 51/295
[58] Field of Search ................... 51/293, 295, 298

[56] References Cited

U.S. PATENT DOCUMENTS

| | | | |
|---|---|---|---|
| 3,743,489 | 7/1973 | Wentorf et al. | 51/307 |
| 3,745,623 | 7/1973 | Wentorf et al. | 29/95 B |
| 3,767,371 | 10/1973 | Wentorf et al. | 51/307 |
| 4,156,329 | 5/1979 | Daniels et al. | 51/295 |
| 4,225,322 | 9/1980 | Knemeyer | 51/295 |
| 4,385,907 | 5/1983 | Tomita et al. | 51/298 |
| 4,446,657 | 5/1984 | Asaeda et al. | 51/298 |
| 4,457,765 | 7/1984 | Wilson | 51/295 |
| 4,850,523 | 7/1989 | Slutz | 51/295 |
| 4,861,350 | 8/1989 | Phaal et al. | 51/295 |
| 4,956,238 | 9/1990 | Griffin | 51/295 |
| 4,972,637 | 11/1990 | Dyer | 51/295 |
| 4,995,887 | 2/1991 | Barr et al. | 51/295 |
| 5,061,293 | 10/1991 | Barr et al. | 51/295 |

Primary Examiner—Karl Group
Assistant Examiner—Willie J. Thompson
Attorney, Agent, or Firm—Scully, Scott, Murphy & Presser

[57] ABSTRACT

A tool insert comprises a composite abrasive compact bonded to a polymer-based support. The composite abrasive compact consists of a compact layer bonded to a substrate and is bonded to the support through bonding surfaces. The composite abrasive compact provides a cutting edge for the tool insert.

14 Claims, 2 Drawing Sheets

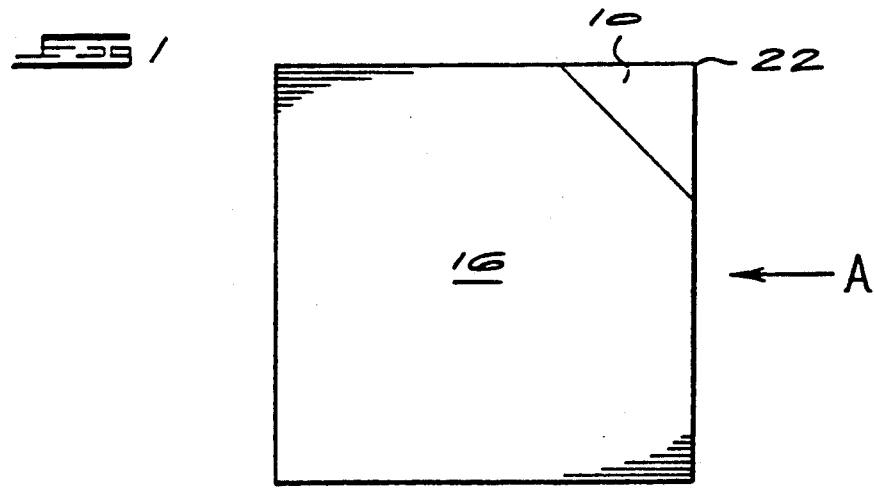
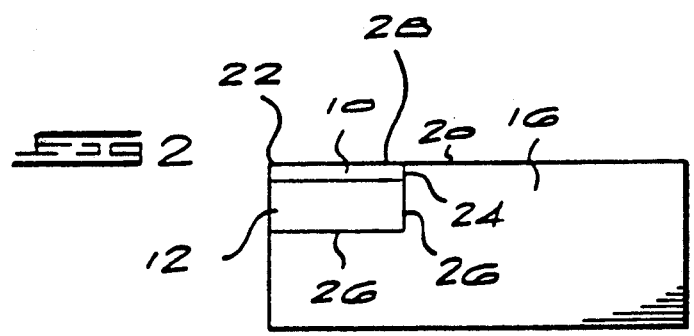
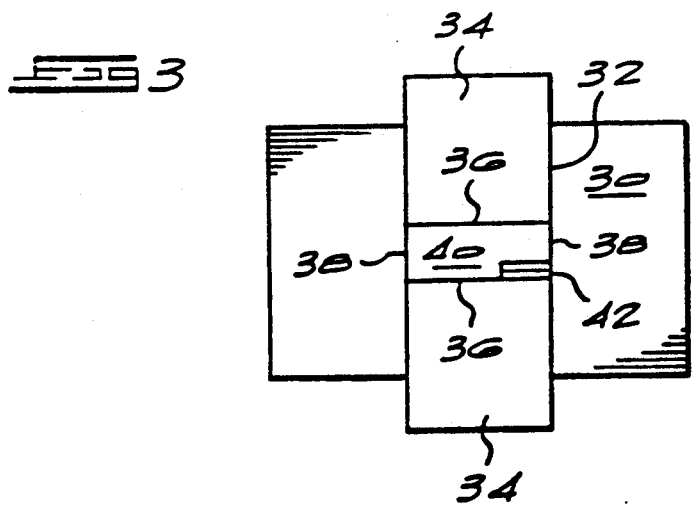

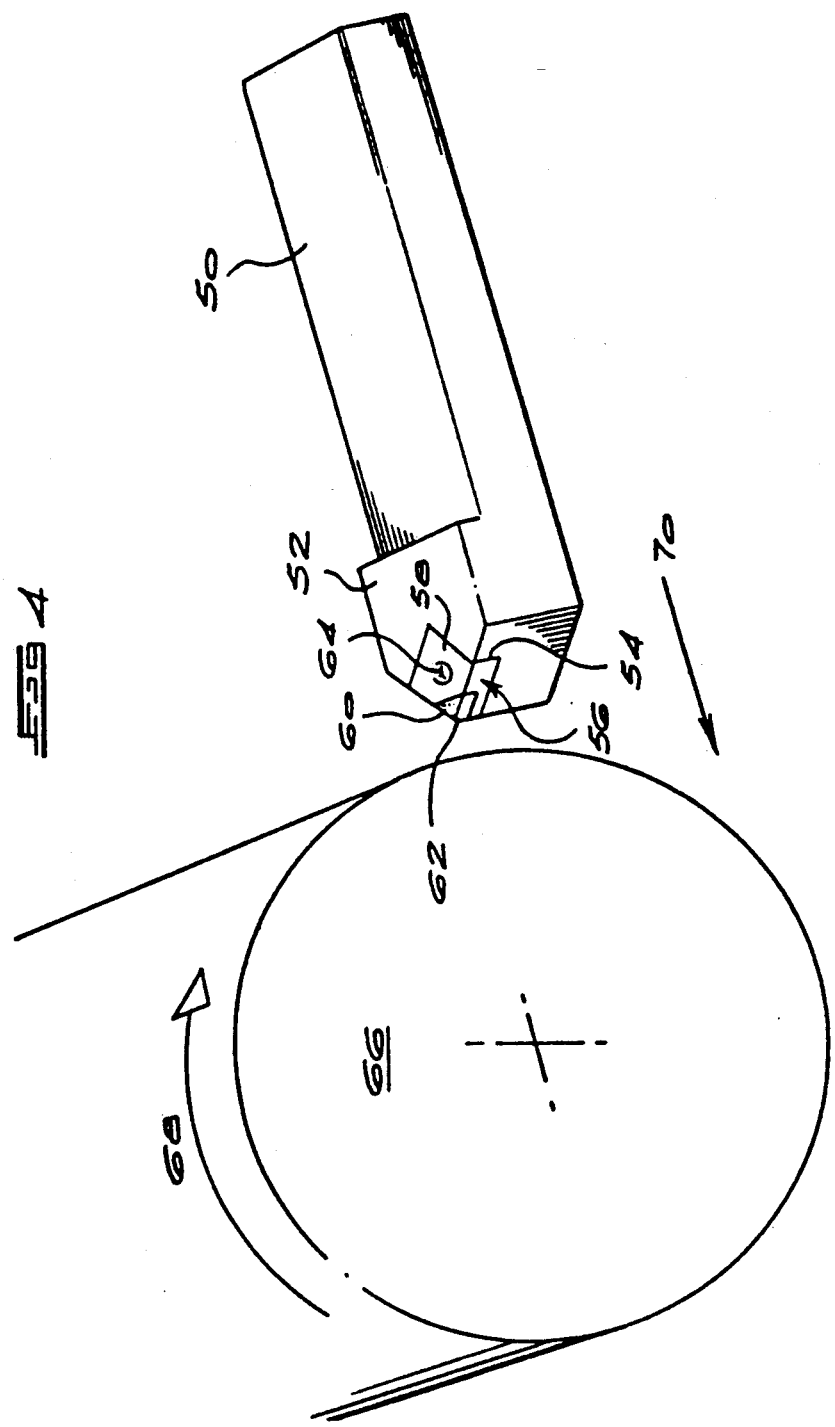

ABRASIVE PRODUCT

BACKGROUND OF THE INVENTION

This invention relates to an abrasive product.

Abrasive compacts are used extensively in cutting, milling, drilling and other similar operations. The abrasive compact consists of diamond or cubic boron nitride particles bonded into a coherent hard conglomerate. The abrasive particle content of abrasive compacts is high and there is an extensive amount of direct particle-to-particle bonding creating a polycrystalline mass. Abrasive compacts are made under elevated temperature and pressure conditions at which the abrasive particle, be it diamond or cubic boron nitride, is crystallographically stable. Diamond abrasive compacts are sometimes referred to as "PCD" while cubic boron nitride compacts are sometimes referred to as "PCBN".

Abrasive compacts tend to be small and relatively brittle and in use they are frequently supported by being bonded to a cemented carbide or steel substrate. Such supported abrasive compacts are known in the art as composite abrasive compacts. The composite abrasive compact may be used as such as the cutting edge of an abrasive tool.

Examples of composite abrasive compacts can be found described in U.S. Pat. Nos. 3,745,623, 3,767,371 and 3,743,489.

Other effective cubic boron nitride abrasive bodies which do not contain as high an abrasive particle content as abrasive compacts are also known and used in the art. Such abrasive bodies may comprise a sintered body containing 40 to 60 volume percent of cubic boron nitride particles uniformly dispersed in a continuous ceramic bonding matrix. These abrasive bodies are also made under temperature and pressure conditions at which the cubic boron nitride is crystallographically stable. An example of such a body is that sold under the trade name DBC-50.

SUMMARY OF THE INVENTION

According to the present invention, there is provided a tool insert comprising an abrasive body containing a mass of ultra-hard abrasive particles in bonded form which is produced under conditions of elevated temperature and pressure at which the abrasive particles are crystallographically stable and which presents a cutting edge or point and a bonding surface, and a polymer-based support bonded to the bonding surface, the polymer having sufficient strength to withstand the forces to which the tool insert is subjected in use.

DESCRIPTION OF THE DRAWINGS

FIG. 1 illustrates a plan view of an embodiment of a tool insert of the invention;

FIG. 2 illustrates a side view of the embodiment of FIG. 1 in the direction of arrow A;

FIG. 3 illustrates a sectional side view of a mould suitable for producing a tool insert of the invention; and FIG. 4 illustrates an embodiment of a cutting tool in use.

DESCRIPTION OF EMBODIMENTS

The abrasive body may be a diamond or cubic boron nitride compact or a cubic boron nitride containing body of the type sold under the trade name DBC-50. All of these abrasive bodies are made under conditions of elevated temperature and pressure at which the abrasive particle is crystallographically stable and are well known in the art.

The abrasive body may be bonded to a substrate such as a steel or cemented carbide substrate. In the case of diamond and cubic boron nitride compacts, the compact will invariably be bonded to a substrate.

The polymer will have sufficient strength to withstand the forces to which the tool insert is subjected during use. It will therefore vary according to the nature of the insert. The polymer is preferably thermoplastic, although thermosetting polymers may also be used. Examples of suitable thermoplastic polymers are polyether ether ketone, polyether ketone, polyaryl ether ketone, poly (amide-imide), and polyphenylene sulphide.

The polymer may be strengthened by including or embedding therein fibres or powders. These powders may be metallic or ceramic in nature and a particularly suitable example is graphite powder or fibre. Typically the powder or fibre will be provided in an amount of up to 40% by mass of the polymer.

An example of a suitable polymer is a high performance poly (amide-imide) resin such as that sold under the trade name Torlon. A particularly suitable resin of this type is that numbered 7130 which contains 30% by mass of graphite fibre and 1% by mass fluoride carbon.

An example of a suitable polyether ether ketone polymer (graphite filled) is PEEK 450 CA 30.

It is important that the support be strongly bonded to the abrasive body for otherwise the support may shear from the abrasive body in use. Bonding can be achieved by the use of a suitable adhesive and improved by roughening or chemically treating the bonding surface of the abrasive body and/or the bonding surface of the substrate. Roughening of the surface of the abrasive body provides a mechanical key which assists in the bonding. Roughening can be achieved, for example, by laser cutting a pattern of recesses or grooves in the bonding surface of the abrasive body or substrate. A heavily roughened surface permits infiltration of the polymer.

The abrasive body may be located in a recess provided in the polymer-based support.

The tool insert of the invention may be used in a variety of tools such as drill bits, routers, saws, cutting tools and the like. A typical example of a cutting tool insert is one which is capable of being mounted on a tool holder such as the shank of a cutting tool. As such it may be used for finishing or a light-to-medium cutting operation where low cutting forces are encountered. Typically, such an operation involves contacting the cutting edge or point of the insert with a workpiece, moving the workpiece relative to the cutting edge or point to remove material from the workpiece, advancing the cutting edge or point along the workpiece at a feed rate of no more than 0.5 mm/revolution, and then advancing the cutting edge or point into the workpiece at a rate of no more than 0.5 mm per pass. Generally the cutting edge or point will be maintained stationary while the workpiece is rotated or moved in a reciprocating manner across it. Alternatively, the workpiece may be kept stationary and the tool moved.

An embodiment of the invention will now be described with reference to the accompanying drawings. Referring to FIGS. 1 and 2, there is shown a cutting tool insert comprising a PCBN abrasive compact 10 bonded to a cemented carbide substrate 12. The compact and substrate together form a composite abrasive compact around which support 16 is moulded or cast. The support 16 is polymer-based and has a strength sufficient to withstand the forces which act on the insert in use.

The support 16 can readily be clamped to a cutting tool shank. Alternatively, a hole can be provided through the support from one major surface 18 to the opposite major surface 20 to permit the composite abrasive body to be fixed to the shank. The edge 22 of the compact provides the cutting edge for the insert. The cutting edge 22 of the abrasive compact 10 may be ground (sharpened) prior to moulding or casting or ground after moulding or casting to the required moulding edge geometry. Bonding between the support 16 and the composite abrasive compact is achieved through bonding surface 24 of the compact 10 and bonding surface 26 of the carbide substrate 12. The bonding surface 26 may be roughened by forming a plurality of shallow grooves in it. The polymer support 16 may also partially cover the top surface 28 of the compact 10.

This insert may be produced using the apparatus illustrated by FIG. 3. Referring to this figure, there is shown apparatus comprising a mould 30 having an annular hole 32 extending therethrough. Plungers 34 operate in the recess 32 and define a mould cavity 40 between their ends 36 and the inner walls 38 of the mould 30. The composite compact 42 is placed in one corner of this mould cavity which is then filled with the desired polymer. The plungers are caused to move towards each other to compact the polymer around the composite abrasive compact whereafter the polymer is cured at its curing temperature. The thus-formed tool insert may be removed from the mould cavity by simply withdrawing one of the plungers to give access to the insert. An alternative approach is to have a closed mould cavity, containing the composite abrasive compact, and into which the required polymer is injection moulded.

FIG. 4 illustrates a tool insert of the type shown in FIGS. 1 and 2 mounted on the end of a cutting tool shank, and its use in a cutting operation. Referring to this drawing, a cutting tool comprises a shank 50 having an end section 52. The end section 52 has a recess 54 in which is located a tool insert 56. The tool insert comprises a polymer-based support 58 having a composite abrasive compact 60 located in one corner thereof. The composite abrasive compact presents a rounded cutting edge 62. The tool insert is held in the recess by means of a bolt 64 passing through it.

In use, the cutting tool is held stationary and a workpiece 66 is rotated in the direction of the arrow 68. The cutting edge 62 is then brought into contact with the workpiece 66 to remove material therefrom. After material has been removed from the workpiece in a particular pass, the cutting edge 62 is advanced into the workpiece a given distance in the direction of arrow 70 to remove more material. For finishing and light-to-medium cutting operations, this infeed will be less than 0.5 mm per pass.

Tool inserts for cutting tools of the type described above were produced wherein the abrasive body consisted of a mass of cubic boron nitride particles dispersec in a ceramic second phase or bonding matrix. The cubic boron nitride particles constituted about 50 percent by volume of the body. This body was bonded to a cemented carbide substrate. The composite was made under elevated temperature and pressure conditions at which cubic boron nitride is crystallographically stable. The support was made of a phenolic resin/bakelite mixture containing in the one instance 70% by weight 20 micron nickel powder and in the other instance 80% by weight of −44 micron aluminium powder and 6% by weight 50 micron graphite powder. These two inserts were clamped to the shanks of a turning tool and used to cut hardened D-3 60 HRC cold work tool steel under the following conditions:

Cutting speed—120 m/min
Feed rate—0.1 mm/rev.
Depth of cut—0.1 mm
Coolant—wet

Turning was continued for 2 minutes without the polymer support or bond between the carbide and polymer support failing.

In another example of the invention a cubic boron nitride compact of the type described above was bonded into a PEEK 450 CA 30 polymer support and tested in the manner set out above except that the depth of cut was 0.25 mm. Satisfactory turning was again achieved for a period of 20 minutes.

We claim:

1. A tool insert comprising an abrasive body containing a mass of ultra-hard abrasive particles in bonded form which is produced under conditions of elevated temperature and pressure at which the abrasive particles are crystallographically stable and which presents a cutting point or edge and a bonding surface, and a polymer-based support bonded to the bonding surface of the abrasive body, the polymer having sufficient strength to withstand the forces to which the tool insert is subjected in use.

2. A tool insert according to claim 1 wherein the abrasive body is located in a recess provided in the polymer-based support.

3. A tool insert according to claim 1 wherein the abrasive body is bonded to a substrate which presents a bonding surface which is bonded to the polymer-based support.

4. A tool insert according to claim 3 wherein at least a part of the bonding surface of the substrate is roughened.

5. A tool insert according to claim 4 wherein the bonding surface of the substrate has a plurality of grooves formed therein.

6. A tool insert according to claim 3 wherein the substrate is a cemented carbide substrate.

7. A tool insert according to claim 1 wherein the polymer-based support is a thermoplastic polymer.

8. A tool insert according to claim 7 wherein the thermoplastic polymer is selected from polyether ether ketone, polyether ketone, polyaryl ether ketone, poly (amide-imide) and polyphenylene sulphide.

9. A tool insert according to claim 1 wherein the polymer contains a mass of powder or fibres embedded therein.

10. A tool insert according to claim 9 wherein the powder or fibre is graphite powder or fibre.

11. A tool insert according to claim 9 wherein the fibre or powder is present in the polymer in an amount up to 40% by mass.

12. A tool insert according to claim 1 wherein the abrasive body is an abrasive compact.

13. A tool insert according to claim 1 wherein the abrasive body is a sintered body containing 40 to 60 volume percent cubic boron nitride particles uniformly dispersed in a continuous ceramic bonding matrix.

14. A method of cutting a workpiece, includes the steps of providing a tool insert according to claim 1 mounted on a tool holder, contacting the cutting edge or point of the insert with the workpiece, moving the workpiece relative to the cutting edge or point to remove material from the workpiece, and advancing the cutting edge or point along the workpiece at a feed rate of no more than 0.5 mm/revolution, and advancing the cutting edge or point into the workpiece at a rate of no more than 0.5 mm per pass.

* * * * *